Patented July 26, 1949

2,477,293

UNITED STATES PATENT OFFICE 2,477,293

ARYL ACRYLATES AND METHACRYLATES AND THEIR POLYMERS

Edward M. Filachione, Philadelphia, and Charles H. Fisher, Abington, Pa., assignors to the United States of America as represented by the Secretary of Agriculture No Drawing. Application June 11, 1947, Serial No. 754,038

2 Claims. (Cl. 260—89.5)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This application is a continuation in part of our copending application for patent Serial No. 513,742 filed December 10, 1943, now U. S. Patent No. 2,423,089.

This invention relates to the preparation of aryl acrylates and methacrylates, and polymers and interpolymers thereof.

An object of our invention is the preparation of aryl and substituted aryl acrylates and methacrylates such as phenyl, tolyl, amylphenyl, cyclohexylphenyl, xenyl, (from para-phenyl phenol), naphthyl, butylphenyl, chlorophenyl, or allylphenyl acrylates and methacrylates some of which are hitherto unknown polymerizable compounds.

A further object is the provision of new compositions of matter and methods for their preparations.

Other objects and advantages of the invention will appear hereinafter.

Polymers and copolymers of aryl and substituted aryl acrylates and methacrylates have in a controllable degree the properties of fluidity, elasticity, plasticity, tensile strength, electrical resistance, resistance to water, organic liquids and gases, transparency, and so forth, which are properties highly desirable in the group of substances commonly designated as plastics. Also, the aryl and substituted aryl acrylates and methacrylates, used either singly or in combination, are particularly valuable in that they can be utilized with other unsaturated monomers to prepare copolymers having various desirable properties.

It is known that the acetylated methyl ester of lactic acid on pyrolysis produces methyl acrylate, but the ethyl ester and higher alkyl esters tend to undergo pyrolytic decomposition with the formation of an unsaturated hydrocarbon and the corresponding acid (Burns, Jones and Ritchie, J. Chem. Soc. 1935, 400–6, 714–7; U. S. Patent 2,183,357, December 12, 1939;- Smith, Fisher, Ratchford and Fein, 1942, Ind. Eng. Chem. 34, 473–479; Claborn, U. S. 2,222,363, November 19, 1940; U. S. Patent 2,229,997, January 28, 1941). This tendency increases as the molecular weight of the alkyl group increases. Thus, the preparation of acrylic esters by the pyrolysis of lactic esters has been limited, and in most instances it has not been feasible to make acrylic esters of high molecular weight in this manner.

We have found that the presence of an aryl or substituted aryl group in place of the alkyl group in the ester of an acetoxycarboxylic acid of the general formula:

(where R is hydrogen or an alkyl group and R' is an aryl or substituted aryl radical) decreases the undesirable side reactions encountered in pyrolysis of the corresponding alkyl esters of higher molecular weight, and that owing to the unusual stability of the aryl and substituted aryl radicals and their esters, acetoxycarboxylic acid esters corresponding to the above-given general formula can be converted readily and in high yields into the corresponding aryl and substituted aryl acrylates or methacrylates as shown below:

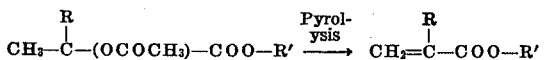

where R and R' have the afore-stated significance.

Transformation of the aryl and substituted aryl esters of acetoxycarboxylic acids into the corresponding acrylates or methacrylates is effected conveniently by passing vapors of the acetoxycarboxylic acid ester through a pyrolysis tube, usually packed in the heated zone with quartz chips or similar contact material maintained at 400° to 600° C. Below 400° C. the conversion is slow, whereas at temperatures substantially in excess of 600° C., extensive decomposition into undesirable by-products usually occurs.

Although the examples given below mention only the acetyl derivatives of the hydroxy carboxylic acid esters, other acyl derivatives of these esters, such as the propionyl or benzoyl derivatives and so forth, in which the acyl radical of the acyloxy group is derived from an acid that is volatile at the temperature of pyrolysis, may also be used. In general the method of our invention is applicable to aryl esters of acyloxypropionic and acyloxyisobutyric acids the aryl radical of which may be either an unsubstituted phenyl radical or a benzene nucleus containing various substituents such as halogen, alkyl groups, aliphatic hydrocarbon radicals, for example, alicyclic radicals like cyclohexyl or monounsaturated ethylenic hydrocarbon radicals like allyl and the like. By way of illustration our process comprises:

(1) Preparation of aryl ester of acyloxycarboxylic acid by reacting the halide or anhydride of the corresponding acyloxycarboxylic acid with a compound containing a phenolic hydroxyl group.

(a)
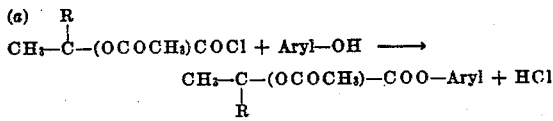

(b)
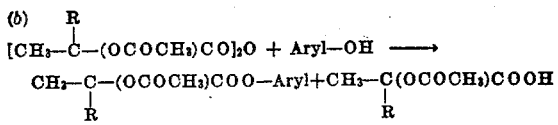

where R is H or alkyl; or by ester interchange between acetoxycarboxylic acid and an aryl ester, such as the acetate of a phenol (c)
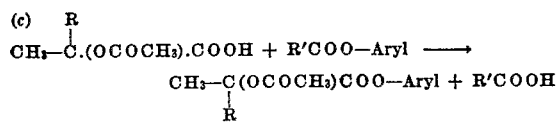

where R is H or CH$_3$ and R' is H or an alkyl radical.

(2) The conversion of the aryl or substituted aryl ester of the acetoxycarboxylic acid into acetic acid and the corresponding acrylate or methacrylate by means of pyrolytic decomposition in accordance with the general equation:

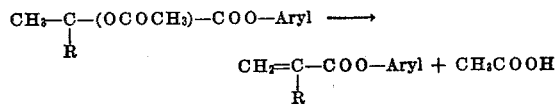

where R is H or alkyl.

(3) The conversion of aryl or substituted aryl acrylate or methacrylate into polymers and copolymers of more or less complexity and magnitude by means of heat or other aids to polymerization. The substances formed as intermediates under step 1 above are the subject of a copending application for patent.

Among the esters of acrylic acid which are made by our process are those of the following formula:

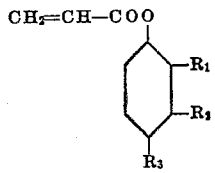

where R$_1$ is a member of the group consisting of hydrogen and monounsaturated ethylenic hydrocarbon radicals; R$_2$ is a member of the group consisting of hydrogen and alkyl; R$_3$ is a member of the group consisting of hydrogen, alkyl, aryl, alicyclic hydrocarbon radicals and halogen; and wherein at least two and no more than two of the substituents R$_1$, R$_2$ and R$_3$ are hydrogen atoms.

The following examples describe in detail a preferred procedure for making the acrylates and methacrylates mentioned above and their polymers.

Example I

Phenyl alpha-acetoxypropionate (116 g.), prepared according to the methods described above, was allowed to run at an approximate rate of 3.2 cc. per minute (contact time approximately 11 seconds) into a Pyrex tube of 30 mm. internal diameter, heated over a length of 13 inches. The tube was heated by an electrical furnace and the temperature was controlled automatically. The average temperature was 532° C. The apparatus was swept out with nitrogen before the pyrolysis was started and also after all of the liquid had been added. A small amount of hydroquinone was added to the condensate to prevent premature polymerization. The crude pyrolysis product consisted of 110 g., which by titration was shown to contain 0.29 moles of acetic acid. The crude pyrolysis product was then distilled at a pressure of approximately 10 mm. of mercury. An approximately 3 percent yield of styrene was isolated from the acetic acid fraction. The phenyl acrylate (34.8 g.), which was collected at 83° to 93° C. at 9-11 mm., was yellow or amber. Some of the starting material (51.8 g. of phenyl alpha-acetoxypropionate) was also recovered, boiling at 135° to 142° C. at 11 mm. The yield of phenyl acrylate based on the 64 g. of starting material destroyed was 76 percent of the theoretical, the yield of acetic acid was 94 percent. The gaseous products of pyrolysis were principally carbon monoxide and carbon dioxide.

A purified sample of phenyl acrylate was found to boil at 64° to 65° C. at 2 mm., and to have a refractive index (D line) of 1.5216 at 20° C., and a density of 1.0762 at 20° C.

Example II o-Tolyl alpha-acetoxypropionate, prepared according to the methods described above, was pyrolyzed in essentially the same equipment as described in Example I.

When 49.4 g. of o-tolyl alpha-acetoxypropionate was pyrolyzed in a tube, packed with Pyrex glass, at 500° C. at an average rate of approximately 15 drops per minute (contact time approximately 15 seconds), there was obtained 46.7 g. of liquid products. Distillation of the pyrolysis product gave 15.7 g. of o-tolyl acrylate boiling at 58° to 64° C. at approximately 0.5 mm., and 19.4 g. of unchanged starting material. The yield of o-tolyl acrylate based on the o-tolyl alpha-acetoxypropionate decomposed was 72 percent.

A purified sample of o-tolyl acrylate was found to boil at 58° to 59° C. at 0.5 mm., and to have a refractive index ($n_D$ at 20° C.) of 1.5160. The density at 20° C. was 1.050.

Example III

Phenyl alpha-acetoxypropionate was pyrolyzed in essentially the same equipment as described in Example I with the modification that the pyrolysis tube was operated at pressure of 18–19 mm. of mercury and the feed was vaporized in a preheater at 220° C. prior to introduction into the furnace. Thus, at 541° C. when the phenyl alpha-acetoxypropionate (78.9 g.) was added over a period of 2.5 hours (contact time 0.77 seconds), there was obtained 78.3 g. (99.5 percent recovery) of liquid products.

Distillation of the liquid products gave 15.1 g. of phenyl acrylate, collected at 38° to 40° C. at a pressure of 0.3 mm. of mercury, and which was substantially colorless. Undecomposed phenyl alpha-acetoxypropionate, 52 g., was also obtained. The yield of pheny acrylate, based on the phenyl alpha-acetoxypropionate decomposed, was 80 percent.

In the following Examples IV through XI the process was conducted essentially according to the procedure and using the equipment described in Example I. The pyrolysis chamber was packed with short lengths of Pyrex tubing. The liquid pyrolyzate was collected in an ice-water cooled receiver and distilled under reduced pressure, in an atmosphere of carbon dioxide, using hydroquinone and/or phenyl beta-naphthylamine as a polymerization inhibitor. The yields of acrylates and methacrylate in percent of the theoretical yield are based on the starting material decomposed.

Example IV

Pyrolysis of 67 g. p-tertiary-amylphenyl alpha-acetoxy-propionate at 547° C. with a contact time of 14.6 seconds, gave 13 g. of p-tertiary amylphenyl acrylate; B. P. 85°–95° C./0.1 mm., $n_D^{20}$ 1.5170. Yield: 40%.

Example V

Pyrolysis of 137 g. p-cyclohexylphenyl alpha-acetoxypropionate at 550° C. with a contact time of 8.9 seconds gave 69 g. of p-cyclohexylphenyl acrylate; B. P. 108°–115° C./0.2 mm. which solidified at room temperature, and on recrystallization from petroleum ether had a melting point of 62–63° C. Yield: 71%.

Example VI

Pyrolysis of 115 g. p-tertiary-butylphenyl alpha-acetoxypropionate at 498° C. (contact time 10.2 seconds) gave 24 g. of p-tertiary-butylphenyl acrylate, B. P. 68°–72° C./0.12 mm.; $n_D^{20}$ 1.5102; $d_4^{20}$ 1.0042. Yield: 72%.

Example VII

Pyrolysis of 142 g. p-tertiary-butylphenyl alpha-acetoxypropionate at 550° C. with a contact time of 10.0 seconds resulted in decomposition of 85% of the starting material and gave an 80% yield of p-tertiary-butylphenyl acrylate.

Example VIII

Pyrolysis of 173 g. m-tolyl alpha-acetoxypropionate at 550° C. (contact time 14.9 seconds) gave 70 g. m-tolyl acrylate, B. P. 70° C./1.5 mm.; $n_D^{20}$ 1.5180; $d_4^{20}$ 1.0490. Yield: 57%.

Example IX

Pyrolysis of 164 g. p-chlorophenyl alpha-acetoxypropionate at 520° C., (contact time 8.5 seconds) gave 50 g. p-chlorophenyl acrylate, B. P. 70° C./1.0 mm.; $n_D^{20}$ 1.5356. Yield: 77%.

Example X

Pyrolysis of 206 g. o-allylphenyl alpha-acetoxypropionate at 550° C. (contact time 9.8 seconds) gave 80 g. o-allylphenyl acrylate, B. P. 72°–78° C./0.6 mm.; $n_D^{20}$ 1.5226; $d_4^{20}$ 1.0359. Yield: 58%.

Example XI

Pyrolysis of 110 g. phenyl alpha-acetoxyisobutyrate at 450° C. (contact time 8.9 seconds) gave 60 g. phenyl methacrylate, B. P. 47°–50° C./0.2 mm.; $n_D^{20}$ 1.5147; $d_4^{20}$ 1.0542. Yield: 90%.

Example XII

Phenyl acrylate obtained by distillation of the pyrolysis product of phenyl alpha-acetoxypropionate apparently contains small amounts of an inhibitor and when a sample of this phenyl acrylate was heated with one percent by weight of benzoyl peroxide at 75° C. did not show any signs of polymerizing. However, when the phenyl acrylate was washed with cold dilute alkali (5 percent sodium hydroxide), the inhibitor is effectively removed. Thus, a sample of phenyl acrylate, which had been purified by washing with cold dilute sodium hydroxide, when heated with one percent of its weight of benzoyl peroxide at 75° C., changed to a soft polymer after 15 minutes. After heating overnight the polymer was soft at 100° C. but hard at room temperature.

Example XIII

Redistilled o-tolyl acrylate, obtained from pyrolysis of o-tolyl alpha-acetoxypropionate, polymerized to a soft polymer when heated at 65° C. with two percent by weight of benzoyl peroxide. However, when the o-tolyl acrylate was washed with cold dilute alkali, the polymerization proceeded much more readily even with one percent benzoyl peroxide and produced a hard and virtually colorless polymer. The polymerized o-tolyl acrylate was hard at room temperature but soft and somewhat elastic at 65° C.

Example XIV

The p-tertiary-amylphenyl acrylate of Example IV was washed with cold, dilute, aqueous sodium hydroxide solution and polymerized by heating at 60° C. with one percent of its weight of benzoyl peroxide. The polymer was clear, colorless and hard at room temperature.

Example XV

The crystalline p-cyclohexylphenyl acrylate of Example V does not undergo polymerization for considerable length of time when stored at room temperature even in the absence of polymerization inhibiting agents. On heating at 65° C. with benzoyl peroxide it was converted into a hard polymer.

Example XVI

Phenyl methacrylate of Example XI readily polymerized on heating at 65° C. with 0.2% by weight of benzoyl peroxide, to a crystal-clear, colorless casting which was hard at room temperature.

Example XVII o-Allylphenyl acrylate of Example X was washed with dilute sodium hydroxide solution and polymerized by heating at 65° C. with 0.5 percent of its weight of benzoyl peroxide. The resulting casting was crystal clear, colorless, very hard and infusible.

Similar products may be obtained by polymerizing other aryl and substituted aryl acrylates and methacrylates, used singly or in combination or in admixture with other unsaturated monomers. Polymerization can be effected either in bulk or in emulsion or in the presence of inert solvents or diluents. The polymers can be produced by heating the monomeric material preferably in the presence of a polymerization catalyst at temperatures and for a length of time sufficient to cause polymerization or by other well-known polymerization methods utilizing light and/or catalysts. Other polymerization catalysts or initiators may be used instead of the benzoyl peroxide, for example, various organic peroxides, ammonium persulfate, and other similar substances commonly utilized as polymerization catalysts.

It will be apparent to those skilled in the art that various modifications may be employed in carrying out our invention. For example, the hydroxy-carboxylic acid may be converted to the acetoxy-carboxylic acid by treatment with acetyl chloride, ketene or acetic anhydride. Moreover, the acyloxy-carboxylic acid may be converted into the corresponding acid chloride by treatment with various reagents, such as phosphorus chlorides or thionyl chloride. Ketene or acid anhydrides, such as acetic anhydride, may be used to convert the acyloxy-carboxylic acid into acyloxy-carboxylic acid anhydride or acyloxy-carboxylic acid acetic anhydride. Either of the latter anhydrides may be treated with phenol or substituted phenol to form the corresponding aryl ester. Moreover, beta-hydroxy-propionic and beta-hydroxy-isobutyric acids and their derivatives may be used by the method of our invention to make various aryl acrylates and methacrylates.

Having thus described our invention we claim:
1. o-Allylphenyl acrylate.
2. Polymerized o-allylphenyl acrylate.

EDWARD M. FILACHIONE.
CHARLES H. FISHER.

REFERENCES CITED

The following references are of record in the file of this patent:

UNITED STATES PATENTS

| Number | Name | Date |
|---|---|---|
| 2,117,349 | Neher | May 17, 1938 |
| 2,129,685 | Graves | Sept. 13, 1938 |
| 2,200,709 | Trommsdorf | May 14, 1940 |
| 2,276,138 | Alderman et al. | Mar. 10, 1942 |
| 2,412,034 | D'Alelio | Dec. 3, 1946 |
| 2,423,089 | Filachione et al. | July 1, 1947 |